(12) United States Patent
Barth et al.

(10) Patent No.: US 10,194,000 B2
(45) Date of Patent: Jan. 29, 2019

(54) DISBURSEMENT OF REGISTRATION INFORMATION TO APPLICATION/SERVICE LAYER AT TIME OF REGISTRATION WITH A NETWORK

(71) Applicant: Verizon Patent and Licensing Inc., Arlington, VA (US)

(72) Inventors: Craig A. Barth, Roanoke, TX (US); Sethumadhav Bendi, Walnut Creek, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 340 days.

(21) Appl. No.: 14/497,421

(22) Filed: Sep. 26, 2014

(65) Prior Publication Data
US 2016/0094397 A1  Mar. 31, 2016

(51) Int. Cl.
G06F 15/16 (2006.01)
H04L 29/06 (2006.01)
H04W 4/14 (2009.01)
H04W 4/50 (2018.01)

(52) U.S. Cl.
CPC .......... *H04L 67/42* (2013.01); *H04L 65/1016* (2013.01); *H04L 65/1063* (2013.01); *H04L 65/1073* (2013.01); *H04W 4/14* (2013.01); *H04W 4/50* (2018.02)

(58) Field of Classification Search
None
See application file for complete search history.

(56) References Cited

U.S. PATENT DOCUMENTS

| | | | |
|---|---|---|---|
| 2001/0052052 A1* | 12/2001 | Peng ...................... | H04L 41/00 711/133 |
| 2006/0291450 A1* | 12/2006 | Ramachandran ... | H04L 12/6418 370/352 |
| 2009/0011763 A1* | 1/2009 | Torres .................. | H04L 65/1016 455/435.1 |
| 2010/0197305 A1* | 8/2010 | Atarius ................ | H04L 65/1016 455/435.1 |
| 2011/0216701 A1* | 9/2011 | Patel .................... | H04L 65/1016 370/328 |
| 2012/0113796 A1* | 5/2012 | Qiu ...................... | H04L 65/1073 370/216 |

(Continued)

*Primary Examiner* — Phyllis A Book

(57) ABSTRACT

A method, a device, and a non-transitory storage medium provide for receiving registration information during a registration with a network, wherein the registration information includes a user identifier of a user registering with another network device of the network and an identifier of the other network device; determining whether registration information pertaining to a previous registration by the user with the network is stored; determining that the registration information pertaining to the previous registration is not stored; storing the received registration information based on determining that the registration information pertaining to the previous registration is not stored; selecting which application server of the network to transmit the received registration information; transmitting the received registration information to the application server based on the selecting; and using the received registration information to provide a service by the application server.

20 Claims, 12 Drawing Sheets

(56) References Cited

U.S. PATENT DOCUMENTS

| | | | | |
|---|---|---|---|---|
| 2012/0214480 A1* | 8/2012 | Ionescu | ................ | H04W 4/001 |
| | | | | 455/425 |
| 2012/0244861 A1* | 9/2012 | Agarwal | ................ | H04W 4/02 |
| | | | | 455/435.1 |
| 2015/0312387 A1* | 10/2015 | Merino Vazquez | ........................ | |
| | | | | H04L 65/1016 |
| | | | | 370/216 |
| 2016/0119386 A1* | 4/2016 | Le Rouzic | ............ | H04L 65/104 |
| | | | | 709/229 |
| 2016/0150052 A1* | 5/2016 | Salmela | ................ | H04L 67/34 |
| | | | | 709/228 |

* cited by examiner

DISBURSEMENT OF REGISTRATION INFORMATION TO APPLICATION/SERVICE LAYER AT TIME OF REGISTRATION WITH A NETWORK

BACKGROUND

Mobile devices offer various services and applications to users, such as a web service, a communication service (e.g., e-mail, short messaging service (SMS), video chat, multimedia messaging service (MMS), telephone, etc.), a media service (e.g., streaming and downloading of music, video, etc.), etc.

DETAILED DESCRIPTION OF PREFERRED EMBODIMENTS

Figure 1:
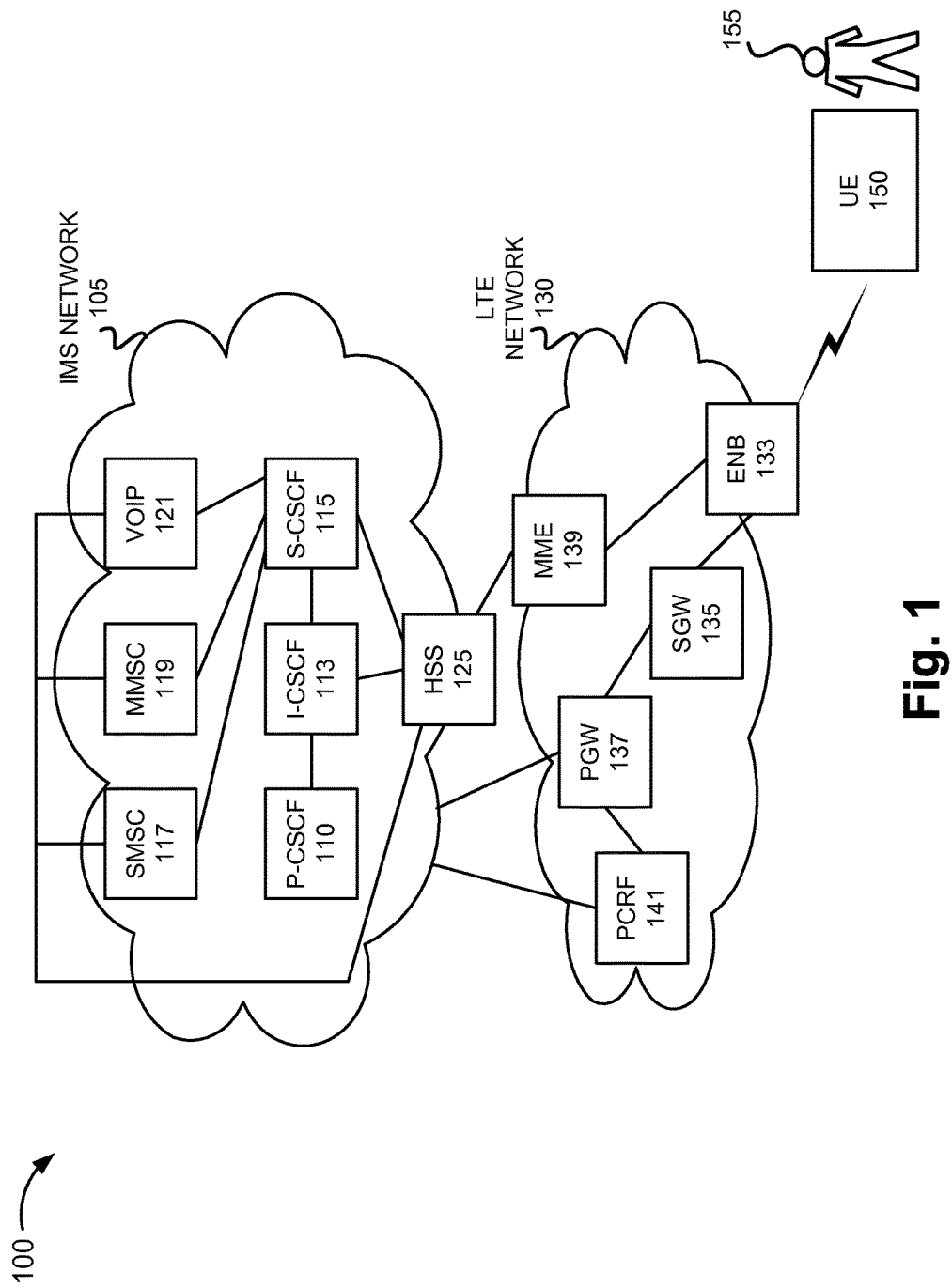
FIG. 1 is a diagram illustrating an exemplary environment in which an exemplary embodiment of a registration service may be implemented.

The following detailed description refers to the accompanying drawings. The same reference numbers in different drawings may identify the same or similar elements. Also, the following detailed description does not limit the invention.

Network administrators are responsible for the operation, administration, provisioning, and maintenance of networks. One aspect of network management concerns network resource utilization. For example, when a service or an application is provided to users, the network administrator would like to minimize traffic in the network when provisioning the service or the application to the users. For example, network signaling between network devices to provision the service on behalf of the users can create an enormous amount of traffic in the network. As an example, consider an Internet Protocol Multimedia Subsystem (IMS) that offers, among other applications and services, a communication service such as a Short Messaging Service (SMS). According to one implementation, when a Short Message Service Center (SMSC) receives an SMS message to deliver to a registered user of the IMS network, the SMSC queries a Home Subscriber Server (HSS) to determine the location or address of the Call Session Control Function (CSCF) that is servicing the registered user. As a result, an enormous amount of signaling traffic is created, which results in link congestion, as well as excessive utilization of the HSS in the IMS network.

According to an exemplary embodiment, a registration service establishes that registration information pertaining to a registration of a user with a network and/or network device of the network is provided to an application device and/or a service device (hereinafter application/service device). According to an exemplary embodiment, a network device associated with a network, with which the user is registered, informs an application/service device with registration information during the user's registration with the network or thereafter. For example, the network device (e.g., a CSCF device) associated with the network (e.g., an IMS network), with which the user is registered or registering, informs an application/service device (e.g., an SMSC device) with registration information pertaining to the user's registration request. According to an exemplary embodiment, the registration information includes an identifier of the network device and an identifier of the user that is registered with the network device. According to an exemplary embodiment, the application/service device stores the registration information and uses the registration information to provide a service or a function. For example, the SMSC device uses the registration information to forward or route incoming SMS messages, which are directed to the user, to the CSCF with which the user is registered.

According to another exemplary embodiment, a network device informs an application/service device with registration information pertaining to another network device with which the user is registered. For example, the network device (an HSS device) informs an application/service device with registration information pertaining to another network device (e.g., a CSCF device) with which the user is registered. For example, the registration information includes an identifier of the other network device and an identifier of the user that is registered with the other network device. According to an exemplary embodiment, the network device stores the registration information. According to an exemplary embodiment, the user also registers with the network device (e.g., the HSS device). According to an exemplary embodiment, the application/service device stores and uses the registration information to provide a service or a function.

According to an exemplary embodiment, if the user re-registers with the network device (e.g., the HSS) and registers with the same other network device (e.g., the same CSCF device), the network device omits to inform the application/service device with the registration information. For example, the HSS uses the stored registration information to determine that the user re-registered with the same CSCF device. Additionally, the application/service device stores the registration information and uses the registration information to provide the service or the function. Alternatively, if the user re-registers with the network device and registers with a different other network device (e.g., a different CSCF device), then the network device informs the application/service device with updated registration information pertaining to the user and the other network device. Similarly, the network device uses the stored registration information to determine whether the user is registered with a different other network device. Additionally, the application/service device stores the updated registration information.

According to an exemplary embodiment, the application/service device includes a communication server device. For example, the application/service device may be implemented as an SMSC device or a Multimedia Message Service Center (MMSC) device. According to an exemplary embodiment, the network device and the application/service device belong to different networks.

According to an exemplary embodiment, the network device selects an application/service device to provide registration information based on historical usage data. For example, the historical usage data indicates an application or a service that the user uses when registered with the network. By way of further example, the historical usage data may indicate that the registered user typically sends and/or receives SMS messages. According to this example, the HSS informs the SMSC with the registration information.

According to an exemplary embodiment, the registration information is broadcast to multiple application/service devices. According to another exemplary embodiment, the registration information is provided to select application/service devices. For example, the HSS may select only certain application/service devices based on the historical usage data.

FIG. 1 is a diagram illustrating an exemplary environment 100 in which an exemplary embodiment of a registration service may be implemented. As illustrated, environment 100 includes an IMS network 105 that includes a Proxy-CSCF (P-CSCF) 110, an Interrogating-CSCF (I-CSCF) 113, a Serving-CSCF (S-CSCF) 115. IMS network 105 also includes an application/service layer that includes an SMSC 117, an MMSC 119, and a Voice-Over-IP (VoIP) server 121. Environment 100 also includes an HSS 125 and a Long Term Evolution (LTE) network 130. LTE network 130 includes an evolved Node B (eNB) 133, a serving gateway (SGW) 135, a packet data network gateway (PGW) 137, a mobility management entity (MME) 139, and a policy charging and rules function (PCRF) 141. Additionally, environment 100 includes a user equipment (UE) 150 and a user 155.

IMS network 105 includes a network defined by an IMS specification or architecture. P-CSCF 110, I-CSCF 113, and S-CSCF 115 are network devices of a control layer of IMS network 105. For example, P-CSCF 110 may function as a Session Initiation Protocol (SIP) proxy that monitors signaling between UE 150 and IMS network 105. P-CSCF 110 may be configured to provide other functions, such as a policy decision function (PDF). I-CSCF 113 may query HSS 125 to retrieve the address of S-CSCF 115 and assign S-CSCF 115 to a user (e.g., user 155) during registration. I-CSCF 113 may also forward messages to S-CSCF 115. S-CSCF 115 may perform session control, handle SIP registrations, and select which application server will provide a service or a function for user 155. Although not illustrated, according to an exemplary embodiment, the control layer of IMS network 105 may include additional network devices, such as gateway control functions, a domain name system (DNS), a session border control, etc.

SMSC 117, MMSC 119, and VoIP 121 are network devices of a service layer of the IMS network 105. SMSC 117 may receive, store, and forward text messages to users. MMSC 119 may receive, store, and forward messages that include multimedia content to users. VoIP 121 may operate as a VoIP server that provides a voice-over-IP service. According to other exemplary embodiments, the service layer may include additional, fewer, and/or different application servers. For example, the service layer may include web services, video streaming, instant messaging, e-mail, etc.

HSS 125 may store user subscription data, and perform authentication and authorization services. According to other embodiments, HSS 125 may be implemented as a Home Location Register (HLR) or a User Profile Server Function (USPF).

LTE network 130 includes a network defined by an LTE specification or architecture. LTE network 130 may operate as a transport layer of IMS network 105. ENB 133, SGW 135, PGW 127, PCRF 141, and MME 139 may each operate according to the LTE specification. UE 150 may be implemented as various mobile devices, such as smartphone, a personal digital assistant, a tablet, a netbook, an information system in a vehicle, or a wearable device (e.g., a watch, etc.).

Although environment 100 includes IMS network 105, according to other embodiments, environment 100 may not include IMS network 105. For example, a proprietary network or a cloud network may include nodes that are similar (e.g., in terms of function) as a CSCF of IMS network 105. For example, the proprietary network or the cloud network may include a node having session control functionalities and/or is an intermediary node (e.g., an anchor point, etc.) between the user device and application services. The user of the user device may also register with or be assigned to the node. According to such an example, an application server may receive and store registration information pertaining to the node.

Additionally or alternatively, although environment 100 includes LTE network 130, according to other embodiments, environment may not include LTE network 130. For example, a variety of access networks or wireless networks may be used instead of LTE network 130, such as a Universal Mobile Telecommunications System (UMTS) network, a Global System for Mobile Communications (GSM) network, a Wideband Code Division Multiple Access (WCDMA) network, a High-Speed Packet Access (HSPA) network, an Evolution Data Optimized (EV-DO) network, and/or another type of wireless network (e.g., an LTE Advanced network, a future generation wireless network architecture, etc.).

Environment 100 may be implemented to include wired, optical, and/or wireless connections among the devices and the networks illustrated. A connection may be direct or indirect and may involve an intermediary device and/or an intermediary network not illustrated in FIG. 1. For example, environment 100 may include a packet core (e.g., a serving GPRS support node (SGSN), a gateway GPRS support node (GGSN)), etc. Additionally, the number, type (e.g., wired, wireless, etc.), and the arrangement of connections between the devices and the networks are exemplary.

A device may be implemented according to a centralized computing architecture, a distributed computing architecture, or a cloud computing architecture (e.g., an elastic cloud, a private cloud, a public cloud, etc.). Additionally, a device may be implemented according to one or multiple network architectures (e.g., a client device, a server device, a peer device, a proxy device, and/or a cloud device).

The number of devices, the number of networks, and the configuration in environment 100 are exemplary. According to other embodiments, environment 100 may include additional devices, fewer devices, and/or differently arranged devices, than those illustrated in FIG. 1. Additionally, or alternatively, environment 100 may include additional networks and/or differently arranged networks, than those illustrated in FIG. 1. For example, environment 100 may include an intermediary network. Also, according to other embodiments, one or more functions and/or processes described as being performed by a particular device may be performed by a different device, or some combination of devices.

Figure 2A:
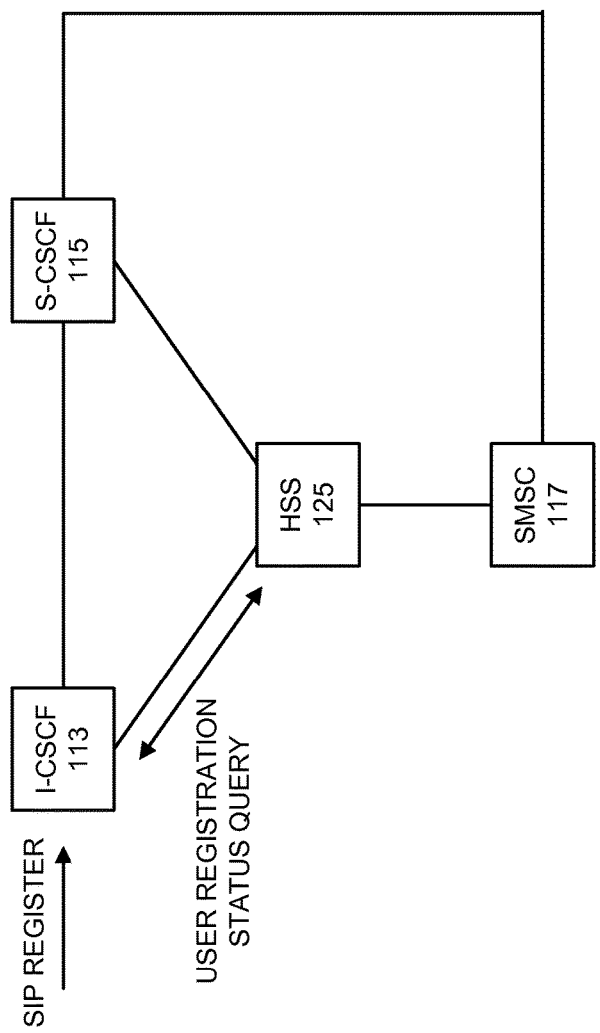
FIGS. 2A-2D are diagrams illustrating an exemplary scenario pertaining to an exemplary embodiment of the registration service.
Figure 2B:
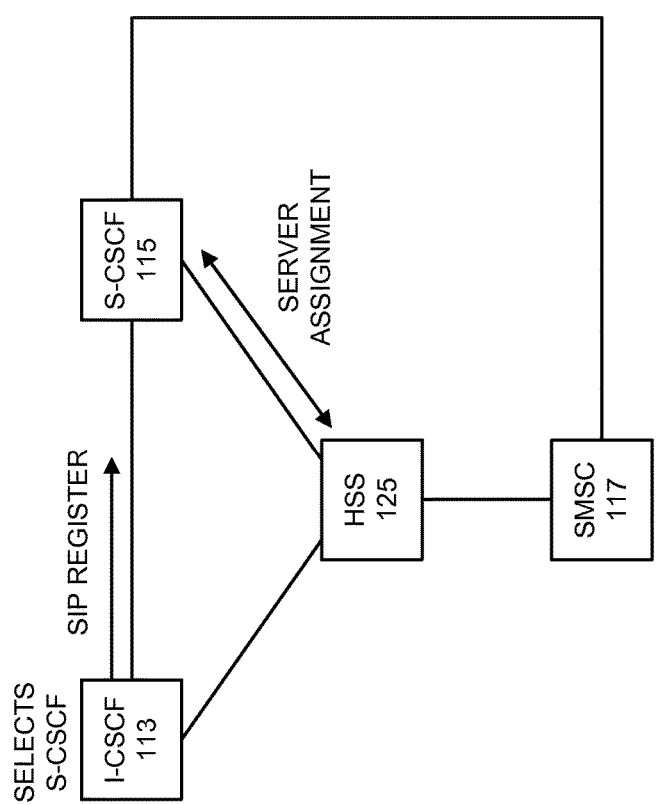

FIGS. 2A-2D are diagrams illustrating an exemplary scenario pertaining to an exemplary embodiment of the registration service. According to the exemplary scenario, assume UE 150 registers and attaches to LTE 130. UE 150 may concurrently or subsequently register with IMS network 105. Referring to FIG. 2A, during the registration with IMS network 105, I-CSCF 113 receives a SIP registration message (e.g., from P-CSCF 110 (not illustrated)). In response, I-CSCF 113 generates and transmits a query for information related to user 155's registration status. For example, the query may be implemented as a Diameter user-authorization-request (UAR). HSS 125 generates and transmits a response to the query. For example, the response may be implemented as a Diameter user-authorization-answer (UAA), which may include S-CSCF required capabilities. Referring to FIG. 2B, based on the response, I-CSCF 113 selects an S-CSCF, such as S-CSCF 115, and transmits a SIP registration message. Although not illustrated, in response to receiving the SIP registration message, S-CSCF 115 may select an authentication vector for use in a user challenge to user 155 (not illustrated). According to this scenario, assume UE 150 and user 155 successfully complete the authentication process. Thereafter, as illustrated in FIG. 2B, S-CSCF 115 informs HSS 125 that user 155 has been registered. For example, S-CSCF 115 generates and transmits a Diameter server-assignment request (SAR). In response to receiving the SAR, HSS 125 generates and transmits a server-assignment-answer (SAA), which may include the user profile. Although not illustrated, S-CSCF 115 may generate and transmit a SIP 200 (OK) message to I-CSCF 113, which indicates that registration was successful. Additionally, a SIP 200 (OK) message is also transmitted to P-CSCF 110 and UE 150.

Figure 2C:
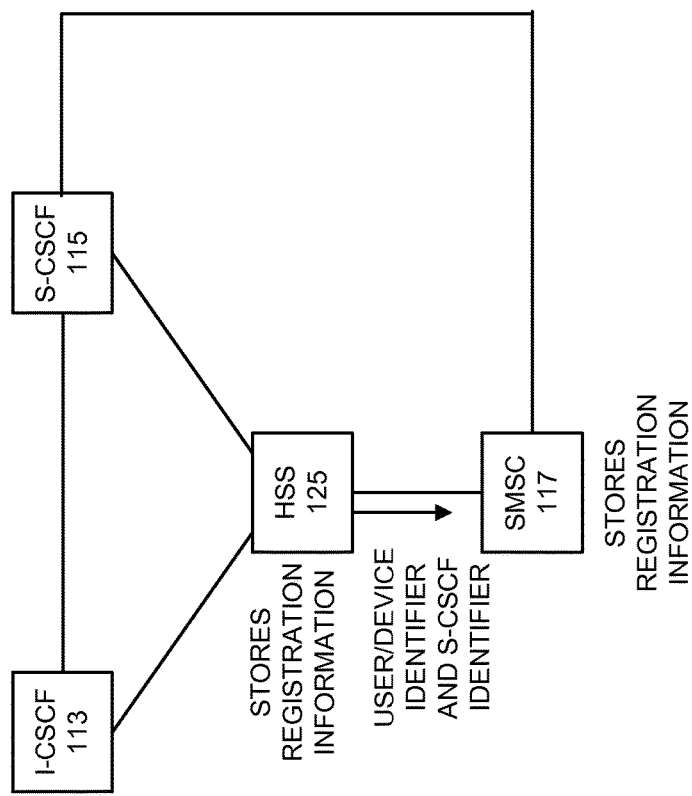

Referring to FIG. 2C, HSS 125 stores registration information pertaining to the successful registration of UE 150 and user 155 with S-CSCF 115. For example, the registration information includes a user identifier and/or a device identifier (e.g., UE 150 identifier). By way of further example, the user identifier and/or the device identifier may be a mobile telephone number (e.g., MSISDN, etc.), an International Mobile Subscriber Identity (IMSI), a temporary IMSI, a network address (e.g., Internet Protocol (IP) address of UE 150, MAC address of UE 150, P-associated Uniform Resource Identifier (URI), information included in the "from" field of a SIP message (e.g., sip: user1_public1@home1.net or other form of a public user identity or a private user identity) from UE 150 during the registration process, and/or other unique identifier. Additionally, for example, the registration information includes an identifier of S-CSCF 115. By way of further example, the identifier of S-CSCF 115 may be an IP address, a fully qualified domain name (FQDN), information included in the "from" field of a SIP message from S-CSCF 115 to HSS 125, or other form of an identifier for S-CSCF 115.

Additionally, as illustrated in FIG. 2C, HSS 125 generates and transmits the registration information (e.g., user identifier and/or device identifier, and S-CSCF 115 identifier) to SMSC 117. For example, HSS 125 generates and transmits (e.g., via an Sh interface) a notification message (e.g., a Diameter subscriber-notification-request (SNR)), which includes the registration information, to SMSC 117. The SNR message may carry the registration information in suitable attribute value pairs (AVPs) or user data types. SMSC 117 receives the registration information and stores the registration information. SMSC 117 generates and transmits, for example, a Diameter subscriber-notification-answer (SNA) to HSS 125.

Figure 2D:
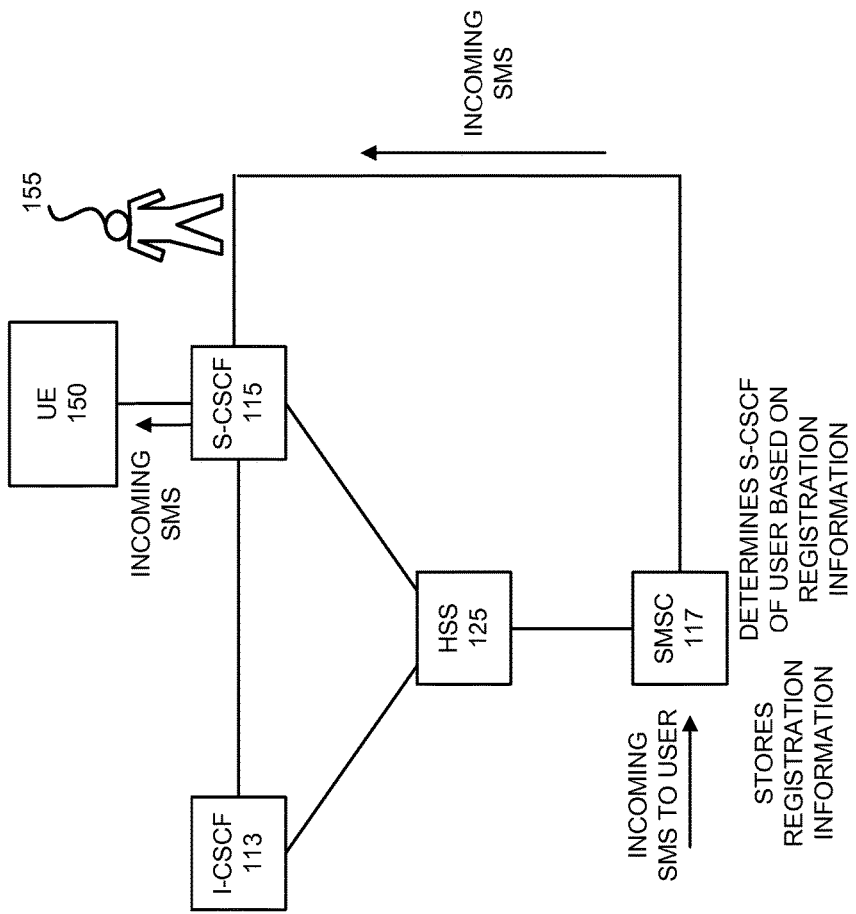

Referring to FIG. 2D, subsequently, assume SMSC 117 receives an incoming SMS message for user 155. SMSC 117 uses the registration information to select S-CSCF 115 as the S-CSCF for forwarding the SMS message. SMSC 117 forwards the SMS message to user 155 via S-CSCF 115. Although FIGS. 2A-2D illustrate exemplary processes associated with the registration service, according to other scenarios, other types of processes may be performed.

Figure 3A:
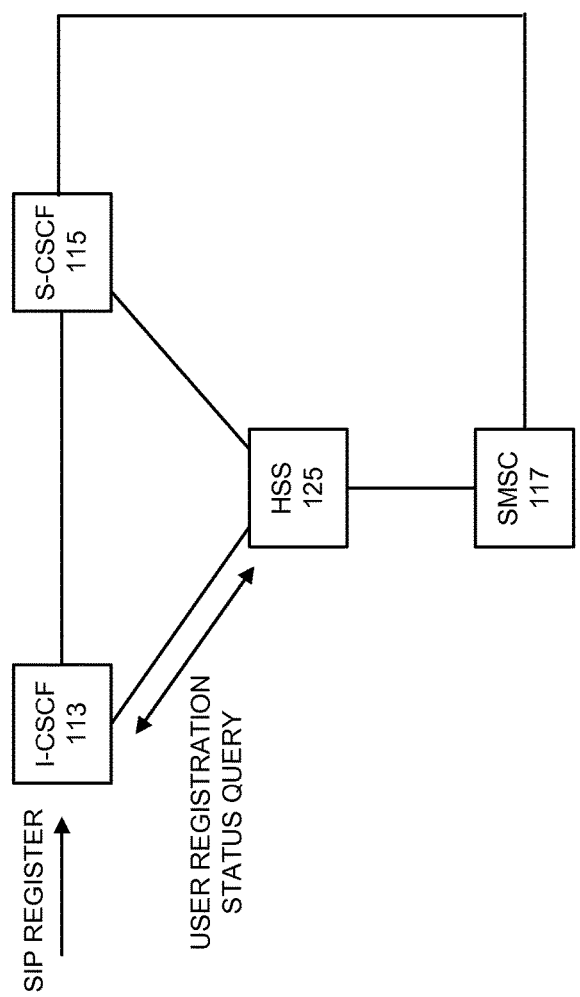
FIGS. 3A-3C are diagrams illustrating another exemplary scenario pertaining to an exemplary embodiment of the registration service.
Figure 3B:
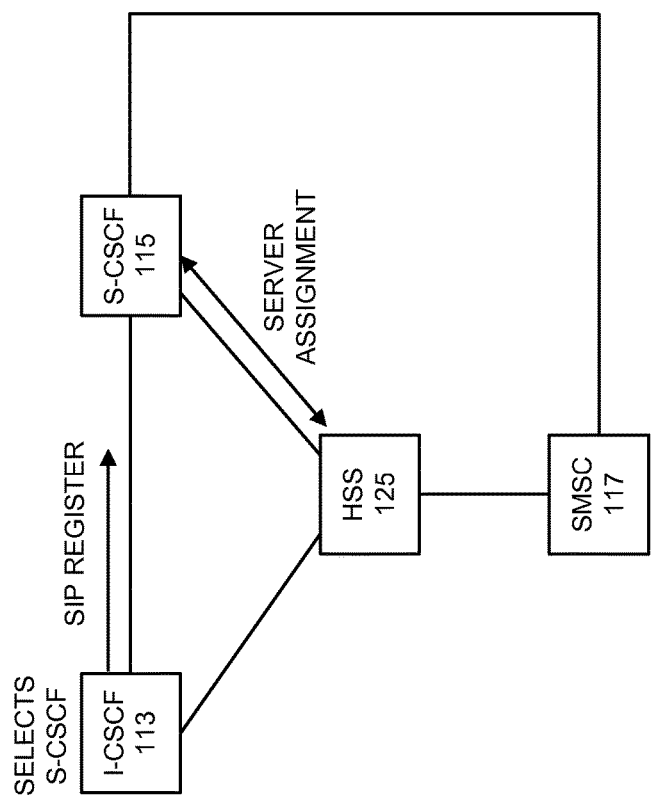
Figure 3C:
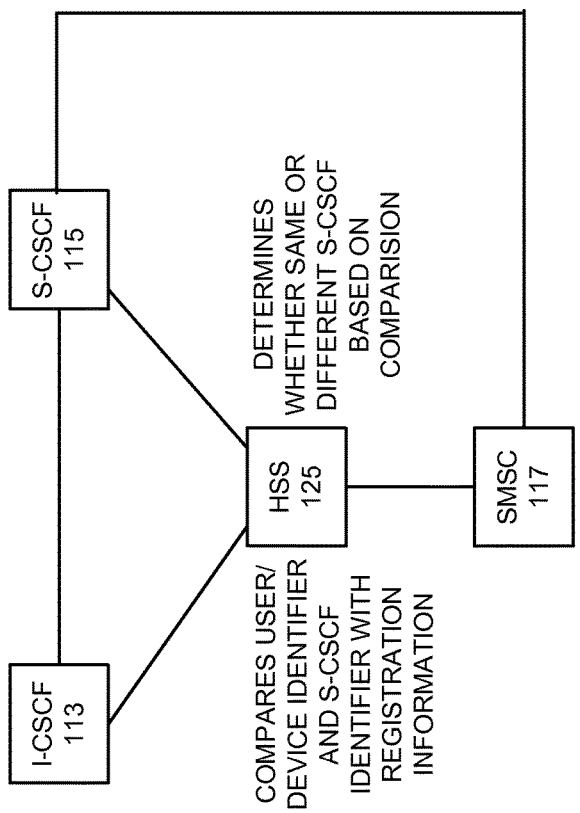

FIGS. 3A-3C illustrate another exemplary scenario pertaining to an exemplary embodiment of the registration service. According to this scenario, in continuation with the scenario described in FIGS. 2A-2D, assume user 155 powers down UE 150 and the next day wishes to re-register with IMS network 105. FIGS. 3A and 3B illustrate exemplary messaging similar to that previously described in FIGS. 2A and 2B in which a registration process is performed. Thus, for the sake of simplicity, FIGS. 3A and 3B will not be described. Referring to FIG. 3C, based on being informed that user 155 is registered with S-CSCF 115, the HSS 125 determines whether previous registration information has been stored. According to this example, HSS 125 determines that registration information has been stored pertaining to a previous registration. HSS 125 compares the previously stored registration information with the current registration to determine whether user 155 is registered with a different S-CSCF 115. According to this scenario, HSS 125 determines that user 155 is registered with the same S-CSCF 115 as before. Based on this determination, HSS 125 does not transmit registration information to SMSC 117. That is, SMSC 117 should still store the registration information for user 155.

Figure 4:
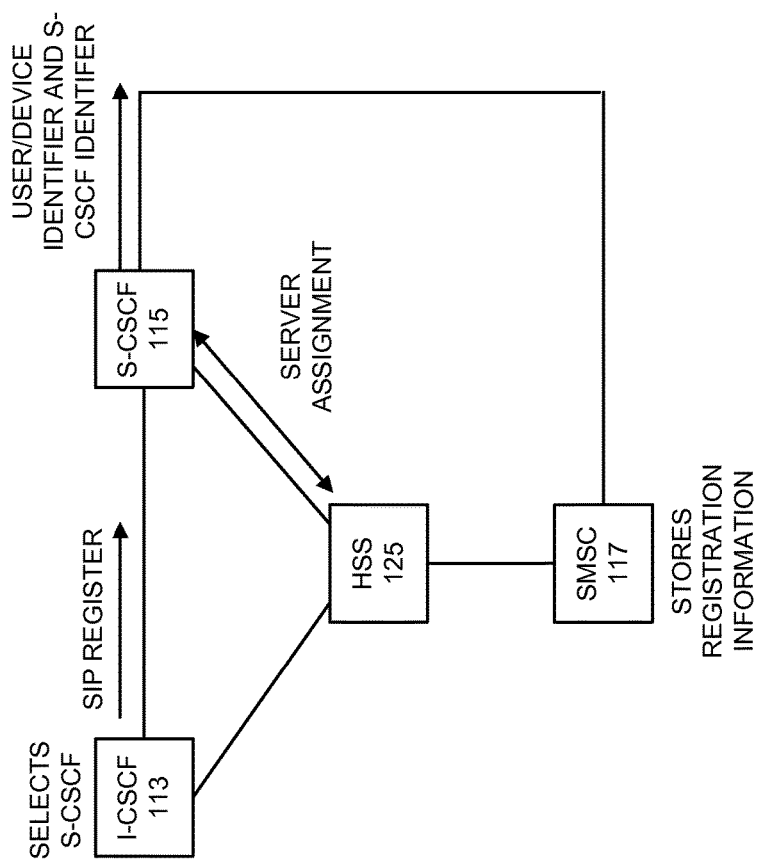
FIG. 4 is a diagram illustrating yet another exemplary scenario pertaining to an exemplary embodiment of the registration service.

FIG. 4 is a diagram illustrating yet another exemplary scenario pertaining to an exemplary embodiment of the registration service. According to this embodiment, instead of HSS 125 informing SMSC 117 that user 155 is registered with S-CSCF 115, S-CSCF 115 informs SMSC 117 that S-CSCF 115 is registered with S-CSCF 115. For example, S-CSCF 115 generates and transmits a message that carries registration information to SMSC 117. For example, S-CSCF 115 may generate and transmit a SIP options message that carries the registration message via the Isc interface. Alternatively, for example, the registration information may be carried via a proprietary message and/or via a new interface to SMSC 117.

Figure 5:
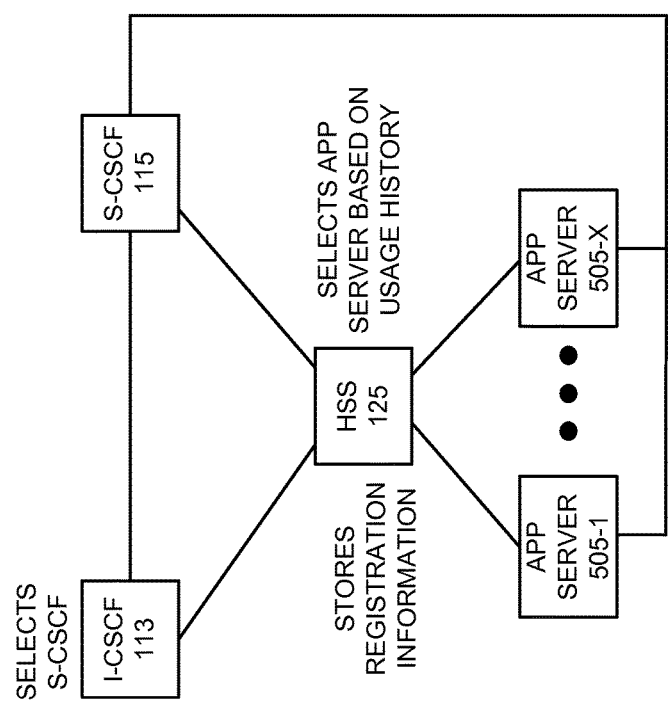
FIG. 5 is a diagram illustrating still another exemplary scenario pertaining to an exemplary embodiment of the registration service.

FIG. 5 is a diagram illustrating still another exemplary scenario pertaining to an embodiment of the registration service. According to this embodiment, HSS 125 stores usage information pertaining to user 155. For example, the usage information indicates which applications and/or services user 155 uses when registered with IMS network 105. Usage information may be generated based on usage indicated in user 155's billing records or session information. HSS 125 may be provided with user 155's usage information. HSS 125 may store usage information as a part of the registration information. In this way, HSS 125 may select which application servers 505-1 through 505-X (also referred to collectively as application servers 505) to transmit registration information based on the usage information. For example, assume that the usage information indicates that user 155 typically receives a number of SMS messages. Based on the usage information, HSS 125 selects application server 505-1 (e.g., an SMSC) as one of the application servers 505 to receive the registration information (e.g., user identifier and/or device identifier and, S-CSCF 115 identifier). According to other embodiments, HSS 125 may broadcast the registration information to each of the application servers 505 or multicast the registration information to a portion of the application servers 505 based on other criteria (e.g., network resource usage levels, etc.).

Figure 6:
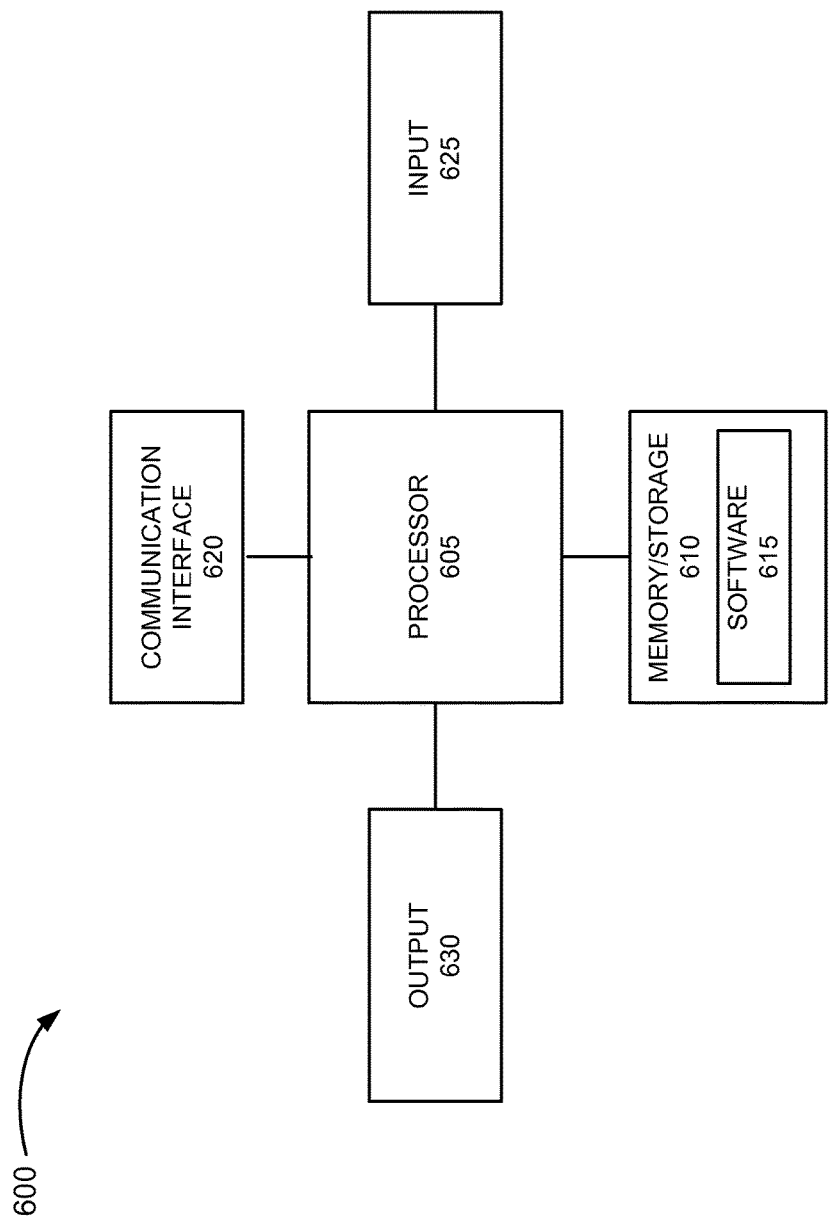
FIG. 6 is a diagram illustrating exemplary components of a device that may correspond to one or more of the devices in an exemplary environment.

FIG. 6 is a diagram illustrating exemplary components of a device 600 that may correspond to one or more of the devices in the environments described herein. For example, device 600 may correspond to S-CSCF 115, HSS 125, UE 150, as well as other devices illustrated and described. As illustrated in FIG. 6, according to an exemplary embodiment, device 600 includes a processor 605, memory/storage 610 that stores software 615, a communication interface 620, an input 625, and an output 630. According to other embodiments, device 600 may include fewer components, additional components, different components, and/or a different arrangement of components than those illustrated in FIG. 6 and described herein.

Processor 605 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 605 may be implemented as hardware (e.g., a microprocessor, etc.), a combination of hardware and software (e.g., a SoC, an ASIC, etc.), may include one or multiple memories (e.g., cache, etc.), etc.

Processor 605 may control the overall operation or a portion of operation(s) performed by device 600. Processor 605 may perform one or multiple operations based on an operating system and/or various applications or computer programs (e.g., software 615). Processor 605 may access instructions from memory/storage 610, from other components of device 600, and/or from a source external to device 600 (e.g., a network, another device, etc.).

Memory/storage 610 includes one or multiple memories and/or one or multiple other types of storage mediums. For example, memory/storage 610 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 610 may include a hard disk (e.g., a magnetic disk, an optical disk, a magneto-optic disk, a solid state disk, etc.) and a corresponding drive. Memory/storage 610 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 610 may include drives for reading from and writing to the storage medium.

Memory/storage 610 may be external to and/or removable from device 600, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 610 may store data, software, and/or instructions related to the operation of device 600.

Software 615 includes an application or a program that provides a function and/or a process. As an example, with reference to S-CSCF 115, software 615 may include an application that, when executed by processor 605, provides the functions of the registration, as described herein. Additionally, for example, with reference to HSS 125, software 615 may include an application that, when executed by processor 605, provides the functions of the registration service, as described herein. Software 615 may include firmware.

Communication interface 620 permits device 600 to communicate with other devices, networks, systems, and/or the like. Communication interface 620 includes one or multiple wireless interfaces and/or wired interfaces. For example, communication interface 620 may include one or multiple transmitters and receivers or transceivers. Communication interface 620 may operate according to a protocol stack and a communication standard.

Input 625 permits an input into device 600. For example, input 625 may include a keyboard, a mouse, a display, a touchscreen, a touchless screen, a button, a switch, an input port, speech recognition logic, and/or some other type of visual, auditory, tactile, etc., input component. Output 630 permits an output from device 600. For example, output 630 may include a speaker, a display, a touchscreen, a touchless screen, a light, an output port, and/or some other type of visual, auditory, tactile, etc., output component.

Device 600 may perform a process and/or a function, as described herein, in response to processor 605 executing software 615 stored by memory/storage 610. By way of example, instructions may be read into memory/storage 610 from another memory/storage 610 (not shown) or read from another device (not shown) via communication interface 620. The instructions stored by memory/storage 610 causes processor 605 to perform a process described herein. Alternatively, for example, according to other implementations, device 600 performs a process described herein based on the execution of hardware (processor 605, etc.).

Figure 7:
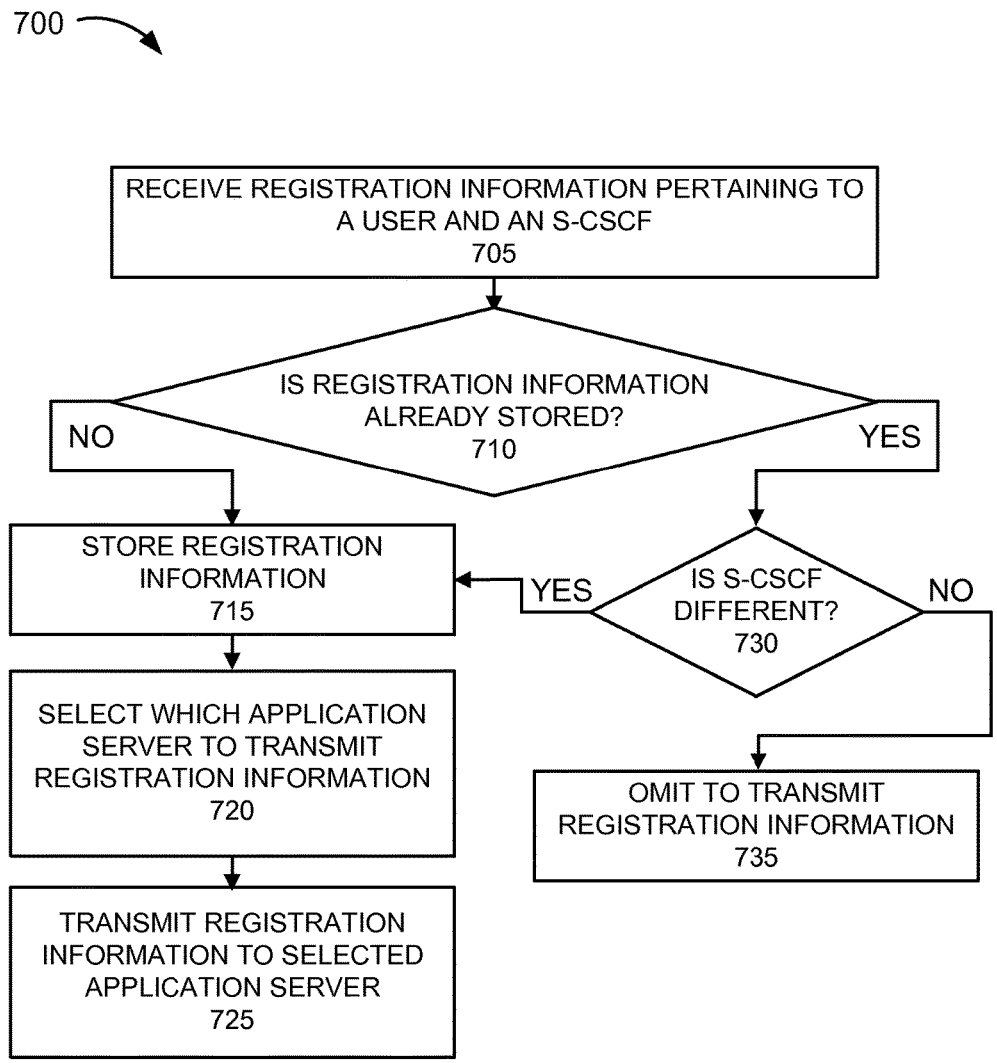
FIG. 7 is a flow diagram that illustrates an exemplary process pertaining to the registration service.

FIG. 7 is a flow diagram illustrating an exemplary process 700 pertaining to the registration service. Process 700 is directed to a process previously described above with respect to FIGS. 2A-2D and 3A-3C, as well as elsewhere in this description, in which registration information pertaining to a user and an S-CSCF is provided to an application server. According to an exemplary embodiment, an HSS performs the steps of process 700. For example, processor 605 executes software 615 to perform the steps described.

Referring to FIG. 7, block 705, process 700 begins with receiving registration information pertaining to a user and an S-CSCF. For example, an HSS receives an SAR from S-CSCF, which indicates that a user is registered with the S-CSCF.

In block 710, it is determined whether registration information is already stored. For example, the HSS determines whether registration information is already stored pertaining to this user. For example, the HSS may query a database that is used to store registration information.

When it is determined that registration information is not already stored (block 710-NO), the registration information is stored (block 715). For example, when the HSS determines that no registration information is stored for this user, the HSS stores the registration information in the database.

In block 720, an application server to transmit the registration information is selected. For example, the HSS selects the application server to transmit the registration information. According to one example, the HSS may select the application server based on usage history pertaining to the user.

In block 725, the registration information is transmitted to the selected application server. For example, the HSS generates and transmits a notification message to the selected application server. The notification message carries the registration information.

When it is determined that registration information is already stored (block 710-YES), it is determined whether the S-CSCF is different (block 730). For example, when the HSS determines that registration information is stored for this user in the database, the HSS determines whether the stored registration information indicates a different S-CSCF than the currently registered S-CSCF.

When it is determined that the S-CSCF is different (block 730-YES), process 700 continues to block 715. For example, the HSS overwrites the stored registration information with the new registration information. Thereafter, process 700 continues to block 720 as previously described.

When it is determined that the S-CSCF is not different (block 730-NO), the registration information is not transmitted (block 735). For example, when the HSS determines that the stored registration information indicates the same S-CSCF as the currently registered S-CSCF, the HSS omits to transmit the registration information to an application server. That is, it may be assumed that the application server already stores the registration information. In this regard, network resource utilization may be minimized in terms of the HSS transmitting registration information and/or the application server querying the HSS to determine which S-CSCF is assigned to the user.

Although FIG. 7 illustrates an exemplary program distribution process 700, according to other embodiments, process 700 may include additional operations, fewer operations, and/or different operations than those illustrated in FIG. 7 and described. For example, process 700 may include steps performed by the application server pertaining to the use of the registration information to provide the service or function.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the process illustrated in FIG. 7, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software and/or firmware executed by hardware. For example, a process or a function may be implemented as "logic" or as a "component." The logic or the component may include, for example, hardware (e.g., processor 605, etc.), or a combination of hardware and software (e.g., software 615). The embodiments have been described without reference to the specific software code since the software code can be designed to implement the embodiments based on the description herein and commercially available software design environments/languages.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 605) of a computational device. A non-transitory storage medium includes one or more of the storage mediums described in relation to memory/storage 610.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction described in the present application should be construed as critical or essential to the embodiments described herein unless explicitly described as such.

What is claimed is:

1. A method comprising:
receiving, by a network device, registration information during a registration with a network, wherein the registration information includes a user identifier of a user registering with another network device of the network and an identifier of the other network device, wherein the network device is one of a Home Subscriber Server (HSS), a Home Location Register (HLR), or a User Profile Server Function (UPSF), and the other network device is a serving-call session control function (S-CSCF);
determining, by the network device, whether registration information pertaining to a previous registration by the user with the network is stored;
determining, by the network device, that the registration information pertaining to the previous registration is not stored;
storing, by the network device, the received registration information based on determining that the registration information pertaining to the previous registration is not stored;

selecting, by the network device, which application server of the network to transmit the received registration information; and transmitting, by the network device, the received registration information to the application server based on the selecting.

2. The method of claim 1, wherein the network includes an Internet Protocol Multimedia Subsystem (IMS) network.

3. The method of claim 2, further comprising:

determining that the registration information pertaining to the previous registration is stored;

determining whether the stored registration information indicates a different S-CSCF than the S-CSCF included in the received registration information based on determining that the registration information pertaining to the previous registration is stored; and omitting to transmit the received registration information based on determining that the stored registration information indicates a same S-CSCF as the S-CSCF included in the received registration information.

4. The method of claim 3, further comprising:

determining that the stored registration information indicates a different S-CSCF than the S-CSCF included in the received registration information; and transmitting the received registration information to the application server based on determining that the stored registration information indicates the different S-CSCF than the S-CSCF included in the received registration information.

5. The method of claim 2, further comprising:

collecting usage history information pertaining to the user, wherein the usage history information indicates services and applications used by the user when registered with the network.

6. The method of claim 5, wherein the selecting comprises:

selecting the application server based on the usage history information.

7. The method of claim 2, further comprising:

generating a notification message that includes the received registration information, and wherein the transmitting comprises:

transmitting the notification message to the S-CSCF.

8. The method of claim 7, wherein the application server includes a short message service center (SMSC), and the method further comprising:

receiving, by the SMSC, the notification message;

storing, by the SMSC, the received registration information;

receiving, by the SMSC, an incoming SMS message for the user; and routing, by the SMSC, the incoming SMS message to the user via the S-CSCF based on the stored registration information.

9. A network device comprising:

a communication interface;

a memory, wherein the memory stores instructions; and a processor, wherein the processor executes the instructions to:

receive, via the communication interface, registration information during a registration with a network, wherein the registration information includes at least one of a user identifier of a user registering with another network device of the network or an identifier of a user device associated with the user and, an identifier of the other network device, wherein the network device is one of a Home Subscriber Server (HSS), a Home Location Register (HLR), or a User Profile Server Function (UPSF), and the other network device is a serving-call session control function (S-CSCF);

determine whether registration information pertaining to a previous registration by the user with the network is stored;

determine that the registration information pertaining to the previous registration is not stored;

store the received registration information based on a determination that the registration information pertaining to the previous registration is not stored;

select which application server of the network to transmit the received registration information; and transmit, via the communication interface, the received registration information to the application server based on the selection.

10. The network device of claim 9, wherein the network includes an Internet Protocol Multimedia Subsystem (IMS) network.

11. The network device of claim 10, wherein the processor further executes the instructions to:

determine that the registration information pertaining to the previous registration is stored;

determine whether the stored registration information indicates a different S-CSCF than the S-CSCF included in the received registration information based on a determination that the registration information pertaining to the previous registration is stored; and omit to transmit the received registration information based on the determination that the stored registration information indicates a same S-CSCF as the S-CSCF included in the received registration information.

12. The network device of claim 11, wherein the processor further executes the instructions to:

determine that the stored registration information indicates a different S-CSCF than the S-CSCF included in the received registration information; and transmit, via the communication interface, the received registration information to the application server based on a determination that the stored registration information indicates the different S-CSCF than the S-CSCF included in the received registration information.

13. The network device of claim 11, wherein the processor further executes the instructions to:

collect usage history information pertaining to the user, wherein the usage history information indicates services and applications used by the user when registered with the network.

14. The network device of claim 13, wherein the processor further executes the instructions to:

select the application server based on the usage history information.

15. The network device of claim 10, wherein the processor further executes the instructions to:

generate a notification message that includes the received registration information, and wherein when transmitting, the processor further executes the instructions to:

transmit, via the communication interface, the notification message to the S-CSCF.

16. A non-transitory, computer-readable storage medium storing instructions executable by a processor of a computational device, which when executed cause the computational device to:

receive registration information during a registration with a network, wherein the registration information includes at least one of a user identifier of a user registering with another network device of the network or an identifier of a user device associated with the user and, an identifier of the other network device, wherein the computational device is one of a Home Subscriber Server (HSS), a Home Location Register (HLR), or a User Profile Server Function (UPSF), and the other network device is a serving-call session control function (S-CSCF);

determine whether registration information pertaining to a previous registration by the user with the network is stored;

determine that the registration information pertaining to the previous registration is not stored;

store the received registration information based on a determination that the registration information pertaining to the previous registration is not stored;

select which application server of the network to transmit the received registration information; and transmit the received registration information to the application server based on the selection.

17. The non-transitory, computer-readable storage medium of claim 16, further storing instructions executable by the processor of the computational device, which when executed cause the computational device to:

determine that the registration information pertaining to the previous registration is stored;

determine whether the stored registration information indicates a different S-CSCF than the S-CSCF included in the received registration information based on a determination that the registration information pertaining to the previous registration is stored; and omit to transmit the received registration information based on the determination that the stored registration information indicates a same S-CSCF as the S-CSCF included in the received registration information.

18. The non-transitory, computer-readable storage medium of claim 17, further storing instructions executable by the processor of the computational device, which when executed cause the computational device to:

determine that the stored registration information indicates a different S-CSCF than the S-CSCF included in the received registration information; and transmit the received registration information to the application server based on a determination that the stored registration information indicates the different S-CSCF than the S-CSCF included in the received registration information.

19. The non-transitory, computer-readable storage medium of claim 17, further storing instructions executable by the processor of the computational device, which when executed cause the computational device to:

collect usage history information pertaining to the user, wherein the usage history information indicates services and applications used by the user when registered with the network.

20. The non-transitory, computer-readable storage medium of claim 19, further storing instructions executable by the processor of the computational device, which when executed cause the computational device to:

select the application server based on the usage history information.

* * * * *